Figure 1:
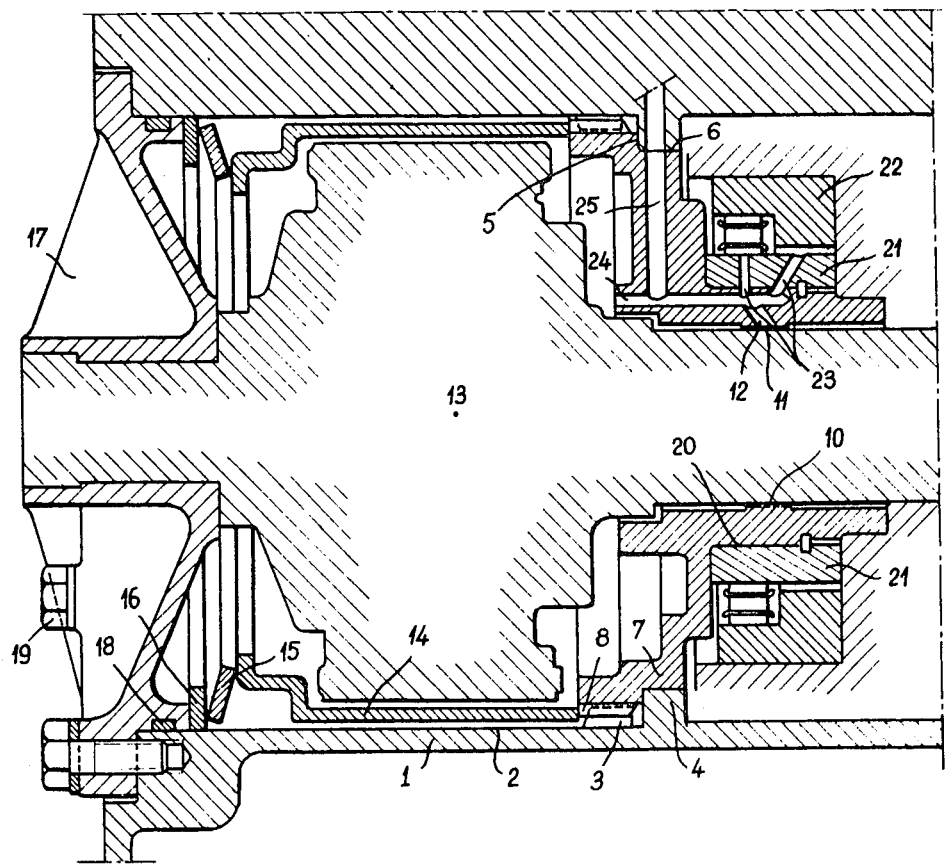

United States Patent

[11] 3,608,986

| | | |
|---|---|---|
| [72] | Inventor | Jean Piret<br>Billancourt, France |
| [21] | Appl. No. | 886,996 |
| [22] | Filed | Dec. 22, 1969 |
| [45] | Patented | Sept. 28, 1971 |
| [73] | Assignees | Regie Nationale des Usines Renault<br>Billancourt (Hauts de Seine), France;<br>Automobiles Peugot<br>Paris, France |
| [32] | Priority | Dec. 31, 1968 |
| [33] | | France |
| [31] | | 183 138 |

[54] BEARING ASSEMBLIES
1 Claim, 2 Drawing Figs.

[52] U.S. Cl. ..................................................... 308/15,
308/3, 308/135
[51] Int. Cl. ..................................................... F16c 31/00
[50] Field of Search........................................... 74/410;
308/3, 135, 140, 142, 143, 26, 15

[56] References Cited
UNITED STATES PATENTS
| 2,012,997 | 9/1935 | Junkers ........................ | 308/26 |
| 3,316,034 | 3/1967 | Wanlass ....................... | 308/26 |

*Primary Examiner*—Martin P. Schwadron
*Assistant Examiner*—R. H. Lazarus
*Attorney*—Stevens, Davis, Miller & Mosher ABSTRACT: Bearing assembly for change speed mechanism which comprises a male peripheral surface adapted to engage a female surface of the casing enclosing said mechanism, a longitudinal bearing face and splines adapted to engage corresponding splines of said casing, this bearing assembly being characterized in that a member opposite to the casing-engaging bearing face coacts in transverse planes on the one side with said bearing and on the other side with a resilient member held by an abutment member against axial movement in relation to the casing.

BEARING ASSEMBLIES

The present invention relates to an improved bearing assembly or mounting notably for transmission mechanisms and is concerned more particularly with the mounting of a central bearing of an automatic change-speed mechanism.

Automatic change-speed mechanisms are currently provided with a central bearing for supporting and lubricating under pressure rotary members such as gears, freewheels, clutch bells and the like. It is clear that these bearings must be dimensioned, machined and fitted with the utmost care in order to be capable of efficiently absorbing radial loads of rotary members and acting as reaction members to the torque generated by the "jamming" action of freewheels.

Bearings are already known which are centered by means of their outer peripheral wall in the casing of the transmission mechanism and provided with a lateral face engaging a casing wall to which the bearing is secured by means of screws acting as torque reaction members.

Obviously, this type of bearing must have considerable dimensions for the securing screws lie on a diameter greater than the diameter permitting the passage of the component elements of the mechanism through the box casing. It may also be noted that as these screws are enclosed in the casing it is not possible to tighten them again without disassembling the gearbox, which constitutes a long operation under any circumstances.

Other bearings are also known which are centered by their outer diameter in the casing and retained in position by radial stud screws. These screws are used for axially positioning the bearing and constitute the torque reaction points. Now this mounting requires a very accurate machining of the assembling holes and tapped holes in the casing. Notwithstanding extreme cares, under no circumstances can the final position of the screws be exactly the one contemplated on the drawing board.

Bearings centered by their outer diameter are also known which are rigidly assembled with the casing of the change-speed mechanism through splines aligned with the outer diameter forming a collarlike extension, these bearings being usually retained in the axial direction by a retaining ring. The main drawback characterizing these bearings lies in the difficulty of machining the retaining ring groove and also the casing-engaging bearing face.

It is an object of the present invention to avoid the above-mentioned inconveniences by providing a bearing assembly comprising a male peripheral surface adapted to engage a female surface of the casing, a longitudinal bearing face and splines adapted to engage corresponding splines of said casing, this bearing assembly being characterized in that a member opposite to the casing-engaging bearing face coacts in transverse planes on the one hand with said bearing and on the other hand with a resilient member held by an abutment member against axial movement in relation to the casing.

The mounting arrangement broadly set forth hereinabove permits holding the bearing in the axial direction and also correcting, during the bearing operation, any misalignment in relation to the vertical axis when the bearing receives a torque tending to rotate same about an axis perpendicular to the axis of rotation of the transmission members.

Figure 2:
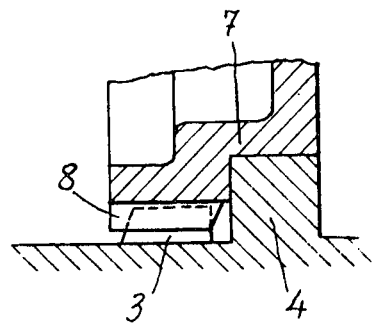

Other advantageous features characterizing this invention will appear as the following description proceeds with reference to the attached drawing illustrating diagrammatically by way of example a typical form of embodiment of this invention. In the drawing:

FIG. 1 is a fragmentary longitudinal axial section showing the bearing mounting, and FIG. 2 is a fragmentary section showing on a larger scale a detail of the assembly of FIG. 1.

Referring too the drawing, the reference numeral 1 designates a casing 1 of a change-speed mechanism which comprises a bore 2 formed with inner splines 3 extending along one fraction of this bore. An integral inner rib 4 of the casing has an abutment face 5 are a cylindrical bearing surface 6 for centering the bearing journal surface of a annular support member 7 provided with adjacent splines 8 engaging the corresponding splines 3 of the casing for holding the annular support 7 against rotation and rigidly coupling same with the casing 1. This annular support member 7 also comprises a cylindrical bearing surface 10 formed with notches or recesses 11; a lube passage 12 for delivering lubricant to the brake harnesses and planet wheels of the automatic change-speed mechanism (shown only diagrammatically in block form at 13) opens into said notches or recesses 11. According to a specific feature of the present invention, a cup-shaped, open-bottomed pressing 14 acting as a distance-piece engages with the edge of its cylindrical portion the outer periphery of annular support member 7. A dished spring washer 15 urges the distance-piece 14 against the annular support member 7 by reacting against a plain washer 16 held in position by an end cap 17 secured to the casing 1 by means of screws 19, a suitable seal 18 being fitted in a groove formed in the peripheral surface of this cap 17 to prevent oil leakages. The annular support member 7 is also formed with a cylindrical bearing bore 20 in which the reaction ring 21 of the freewheel 22 is force fitted; this freewheel 22 is also lubricated through passages 23 communicating with passages 24 and 25 formed in the annular support member 7 and also adapted to supply oil to the aforesaid lube passage 12. The ring 21 is fitted to the annular support member 7 preferably according to the temperature difference method, and the ring is held against angular movement in relation to the bearing member by cutting splines during the fitting into the bearing body. To this end, the ring 21, preferably of hardened steel, is formed with inner teeth machined preferably according to the known broaching process.

Duing actual operation the bearing receives a torque tending to rotate same about an axis perpendicular to the axis of rotation.

In general this torque is due to the bracing or "jamming" action of the freewheel 22 of which the effort is transmitted to the annular support member 7 via ring 21. According to this invention, the dished-spring washer 15 exerts on the bearing member, via the cup-shaped distance piece 14, a considerable prestress counteracting any axial movement of the bearing member. Another advantage characterizing this arrangement lies in the easy access to the bearing clamping and holding means, and also in the possibility of adjusting the resilient pressure exerted through the dished-spring washer 15.

I claim:

1. A bearing assembly for a change-speed mechanism comprising a casing having a bore therein with an abutment face and splines with said bore; an annular support member having an outer cylindrical bearing surface adapted to engage in said bore, an abutment face and splines adapted to engage like portions of said casing; an open-bottomed, cup-shaped distance piece having one end engaging with said support member; a resilient dished-spring washer; and an abutment member holding said washer against the other end of said distance piece to prevent axial movement thereof in relation to the casing.